United States Patent
Hiltner et al.

(10) Patent No.: US 8,751,223 B2
(45) Date of Patent: Jun. 10, 2014

(54) ENCODED PACKET SELECTION FROM A FIRST VOICE STREAM TO CREATE A SECOND VOICE STREAM

(75) Inventors: Jeffrey A. Hiltner, Winfield, IL (US); Alan H. Matten, Chicago, IL (US); Dale R. Schumacher, Lombard, IL (US); Albert J. Such, Carol Stream, IL (US)

(73) Assignee: Alcatel Lucent, Paris (FR)

( * ) Notice: Subject to any disclaimer, the term of this patent is extended or adjusted under 35 U.S.C. 154(b) by 461 days.

(21) Appl. No.: 13/068,924

(22) Filed: May 24, 2011

(65) Prior Publication Data

US 2012/0303364 A1    Nov. 29, 2012

(51) Int. Cl.
*G10L 21/02* (2013.01)
(52) U.S. Cl.
USPC .......................... 704/215; 704/500; 375/228
(58) Field of Classification Search
USPC ................... 704/215, 500; 375/228
See application file for complete search history.

(56) References Cited

U.S. PATENT DOCUMENTS

| | | | |
|---|---|---|---|
| 5,835,889 A * | 11/1998 | Kapanen | 704/215 |
| 8,532,984 B2 * | 9/2013 | Rajendran et al. | 704/205 |
| 8,543,388 B2 * | 9/2013 | Sandgren et al. | 704/219 |
| 2003/0065508 A1 * | 4/2003 | Tsuchinaga et al. | 704/215 |
| 2008/0027717 A1 | 1/2008 | Rajendran et al. | |

FOREIGN PATENT DOCUMENTS

EP    1475929    11/2004

OTHER PUBLICATIONS

Fang Qualcomm Z; RTP Payload format for Enhanced Variable Rate Narrowband-Wideband Codec (EVRC-NW); draft-ietf-avt-rtp-evrc-nw-02.txt; Internet Engineering Task Force, IETF; Standardworkingdraft, Internet Society (ISOC) 4, Rue des Falaises CH—1205 Geneva Switzerland; No. 2, Nov. 30, 2010; pp. 1-28;XP015072770 [Retrieved on Nov. 30, 2010].

* cited by examiner

*Primary Examiner* — Daniel D Abebe
(74) *Attorney, Agent, or Firm* — Carmen Patti Law Group, LLC

(57) ABSTRACT

In one implementation, a first voice stream for a packet-switched call is received from a calling party. The first voice stream conforms to a first silence suppression scheme and comprises a plurality of encoded packets for the packet-switched call. A subset of encoded packets are selected from the plurality of encoded packets to create a second voice stream that conforms to a second silence suppression scheme. The second voice stream comprises the subset of encoded packets. The first silence suppression scheme is distinct from the second silence suppression scheme. The second voice stream is forwarded toward a called party for the packet-switched call.

15 Claims, 12 Drawing Sheets

ENCODED PACKET SELECTION FROM A FIRST VOICE STREAM TO CREATE A SECOND VOICE STREAM

TECHNICAL FIELD

The invention relates generally to silence suppression in a voice stream.

BACKGROUND

Voice calls over packet-switched networks are performed using a codec at a transmitting device to create encoded packets that represent a user's voice. The encoded packets are forwarded over the packet-switched network and decoded at a receiving device. Examples of transmitting and receiving devices comprise a mobile phone, smart phone, Voice over Internet Protocol (VoIP) terminal, personal computer, or other telephony devices. In one implementation, a mobile phone encodes a calling party's voice into a plurality of encoded packets. The mobile phone sends the encoded packets to the packet-switched network as a voice stream (e.g., a stream of packets). The packet-switched network forwards the voice stream to a mobile phone of a called party where the encoded packets are decoded for playback to the called party. Analogously, the called party's voice is encoded and forwarded to the calling party for playback.

In this implementation, the mobile phone employs an Enhanced Variable Rate Codec (EVRC) standard to create encoded packets from the user's voice. Each encoded packet represents a 20 millisecond sample of the user's voice and/or background noise. Based on the sample, the encoded packet is created at one code rate of a plurality of predefined code rates and associated sizes, which are defined by the EVRC standard. Examples of code rates in EVRC comprise full rate, half rate, and eighth rate, which have packet sizes of 171 bits, 80 bits, and 16 bits, respectively. Encoded packets or frames that are encoded at the eighth rate (e.g., eighth rate frames, eighth rate packets, or rate ⅛ frames) are generally used for samples that are predominantly background noise since they have a smaller frame size, use fewer network resources to be transmitted, and the background noise is not necessary for conversation between the users, as will be understood by those skilled in the art.

When the calling party is generally silent, such as when listening to the called party or during a pause in conversation, eighth rate frames are encoded by the transmitting device and forwarded to the called party. Since background noise is generally not an important part of the conversation, some of the eighth rate frames can be removed from the voice stream for transmission over the packet-switched network and replaced or substituted with another eighth rate frame before playback at the receiving device. A complete elimination of background noise from the voice stream sounds to the called party as if the call has been dropped or otherwise ended.

SUMMARY

The invention in one implementation encompasses a method. A first voice stream for a packet-switched call is received from a calling party. The first voice stream conforms to a first silence suppression scheme and comprises a plurality of encoded packets for the packet-switched call. A subset of encoded packets are selected from the plurality of encoded packets to create a second voice stream that conforms to a second silence suppression scheme. The second voice stream comprises the subset of encoded packets. The first silence suppression scheme is distinct from the second silence suppression scheme. The second voice stream is forwarded to a called party for the packet-switched call.

Another implementation of the invention encompasses an apparatus. The apparatus comprises a silence suppression interface component configured to receive a first voice stream for a packet-switched call from a calling party. The first voice stream conforms to a first silence suppression scheme and comprises a plurality of encoded packets for the packet-switched call. The silence suppression interface component is configured to select a subset of encoded packets from the plurality of encoded packets to create a second voice stream that conforms to a second silence suppression scheme. The second voice stream comprises the subset of encoded packets. The first silence suppression scheme is distinct from the second silence suppression scheme. The silence suppression interface component is configured to forward the second voice stream to a called party for the packet-switched call.

A further implementation of the invention encompasses an article. The article comprises one or more non-transitory processor-readable media storing instructions which, when executed by a processor, cause the processor to perform a method. The method comprises the step of receiving a first voice stream for a packet-switched call from a calling party, where the first voice stream conforms to a first silence suppression scheme and comprises a plurality of encoded packets for the packet-switched call. The method further comprises the step of selecting a subset of encoded packets from the plurality of encoded packets to create a second voice stream that conforms to a second silence suppression scheme, where the second voice stream comprises the subset of encoded packets and where the first silence suppression scheme is distinct from the second silence suppression scheme. The method further comprises the step of forwarding the second voice stream to a called party for the packet-switched call.

DETAILED DESCRIPTION

As described in the Background, some eighth rate packets can be removed from the voice stream to improve transmission efficiency of the voice stream. Removal of eighth rate packets is also known as silence suppression. For example, a silence suppression scheme comprises rules and/or parameters which can be used to "drop" or omit one or more eighth rate (or background noise) packets from a continuous stream of packets to create a discontinuous stream. A silence suppression scheme may be used to both reduce the number of encoded packets that represent background noise which are transmitted toward or across the packet-switched network and to maintain a certain amount of background noise or "comfort noise" in the voice stream, as will be appreciated by those skilled in the art.

Current implementations of transmitting devices, receiving devices, and packet-switched networks can apply silence suppression schemes over one or more portions of the packet-switched network. One example of a silence suppression scheme is a discontinuous transmission (DTX) scheme. Examples of DTX schemes are described in $3^{rd}$ Generation Partnership Project 2 (3GPP2) documents C.S0076-0 and C.S0014-D (www.3gpp2.org) and also in Internet Engineering Task Force (IETF) internet standard documents RFC 3558 and RFC 4788, and further in IETF internet draft "draft-ietf-avt-rtp-evrc-nw-02" (www.ietf.org), which are incorporated herein by reference.

The transmitting and/or receiving device in one example may employ 3GPP2 compatible silence suppression (e.g., prior to sending a voice stream over the packet-switched network) while the packet-switched network employs the IETF compatible (e.g., RFC 4788, IETF draft draft-ietf-avt-rtp-evrc-nw-02, or similar) silence suppression. The 3GPP2 Enhanced Variable Rate Codec Narrowband-Wideband (EVRC-NW; described in C.S0014-D) describes a modified DTX scheme. Accordingly, a voice stream which conforms to the EVRC-NW silence suppression scheme may not conform to the RFC 4788 or similar (e.g., IETF draft-ietf-avt-rtp-evrc-nw-02) silence suppression scheme.

Figure 1:
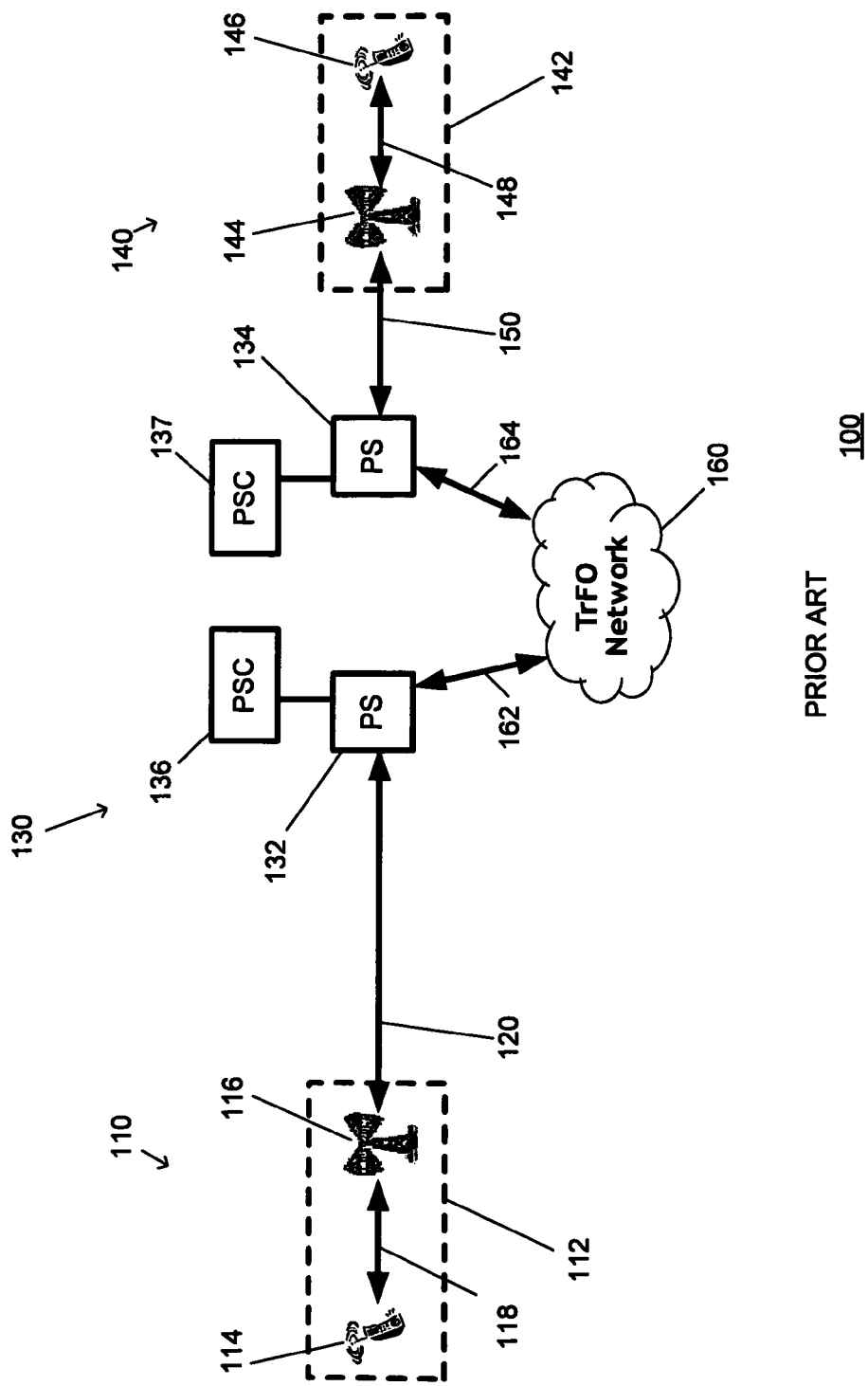
FIG. 1 is a representation of one embodiment of an apparatus that comprises a transmitting device, a packet-switched network, and a receiving device.

Turning to FIG. 1, an apparatus 100 of the prior art comprises a transmitting device 110, a packet-switched network 130, and a receiving device 140. The apparatus 100 is configured to carry a voice stream (i.e., voice bearer traffic) from a user (not shown) of the transmitting device 110 to a user (not shown) of the receiving device 140. As described above, the voice stream comprises a plurality of voice packets or frames encoded at different rates. One or more of the plurality of voice packets are forwarded from the transmitting device 110, over the packet-switched network 130, and to the receiving device 140.

The transmitting device 110 and receiving device 140 in one implementation comprise mobile stations of a cellular communication network. For example, the transmitting device 110 comprises a mobile station 114 in a calling party network (or call domain) 112 and the receiving device 140 comprises a mobile station 146 in a called party network (or call domain) 142. The mobile stations 114 and 146 are configured to communicate with respective base stations 116 and 144 over respective air interfaces 118 and 148, as will be appreciated by those skilled in the art. The base stations 116 and 144 in one example comprise cellular base stations.

The packet-switched network 130 in this implementation comprises a core network, transport network, back-haul network, or other packet-switched network. The packet-switched network 130 in one example comprises one or more packet switches 132 and 134. Examples of the packet switches 132 and 134 comprise packet switch gateways (PSG), media gateways (MGW), packet frame selectors, routers, and other network devices. In alternative implementations, the packet-switched network 130 comprises or is coupled with a Transcoder Free Operation (TrFO) network, such as TrFO network 160. While only two packet switches are shown, the packet-switched network 130 may comprise additional packet switches. Accordingly, the packet switches 132 and 134 may be located in an interior or on edges of the packet-switched network 130, as will be appreciated by those skilled in the art.

The packet switch 132 is configured to communicate with the base station 116 and the TrFO network 160 over interfaces 120 and 162, respectively. The packet switch 134 is configured to communicate with the base station 144 and the TrFO network 160 over interfaces 150 and 164, respectively. Examples of the interfaces 120, 162, 150, and 164 comprise wireline, wireless, fiber optic, or other communication paths, as will be appreciated by those skilled in the art.

The packet-switched network 130 in one example comprises or is coupled with one or more packet switch controllers (PSC) 136 and 137. Examples of the packet switch controllers 136 and 137 comprise an access manager, mobile switching center (MSC), or mobile switching center emulation (MSCe) component. The packet switch controllers 136 and 137 in one example are configured to manage communications between the calling party network 112, the called party network 142, and the packet-switched network 130. For example, the packet switch controllers 136 and 137 instruct the base stations 116 and 144 and packet switches 132 and 134 to create a voice bearer path for the packet-switched call, as will be appreciated by those skilled in the art. In other implementations, both packet switches 132 and 134 may be controlled by a single packet switch controller.

Figure 2:
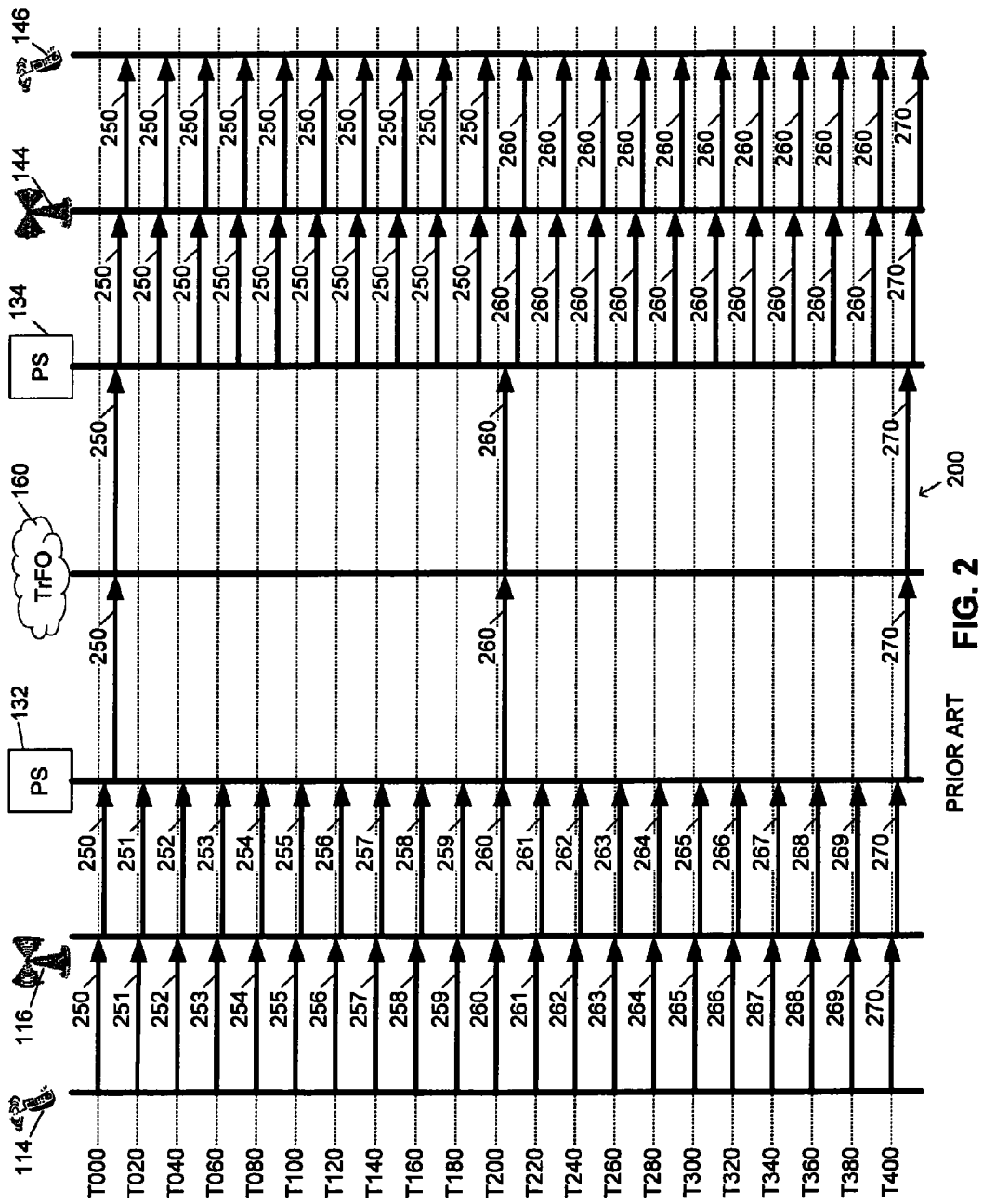
FIG. 2 is a representation of one implementation of packet flow through the apparatus of FIG. 1, illustrating silence suppression in the packet-switched network.

One or more of the transmitting device 110, the packet-switched network 130, and the receiving device 140 are configured to employ respective silence suppression schemes. Turning to FIG. 2, a packet flow 200 of the prior art represents one example of a flow of packets for a call (e.g., voice stream) between the mobile station 114 and 146 for the apparatus 100 of FIG. 1. The packet flow 200 shows a sample duration of 400 milliseconds of silence or background noise with 20 millisecond intervals between encoded packets. In this example, the call domains (e.g., mobile stations 114 and 146 and base stations 116 and 144) are configured to forward the voice packets over interfaces 118, 120, 148, and 150 without a silence suppression scheme. Accordingly, eighth rate encoded packets 250, 251, 252, . . . 270 (e.g., silence frames)

are forwarded from the mobile station 114 to the packet switch 132 via the base station 116.

The packet switch 132 of FIG. 2 is configured to employ a silence suppression scheme across the TrFO network 160 to the packet switch 134. In one example, the silence suppression scheme of the packet switch 132 is compatible with or conforms to the RFC 4788 or similar DTX scheme (including IETF draft draft-ieff-avt-rtp-evrc-nw-02). As described in 3GPP2 C.S0076-0, the DTX scheme comprises Silence Insertion Description (SID) frames which are eighth rate packets sent during DTX periods of silence. A "guaranteed update interval" or silence suppression interval N is a number of packets from one SID frame to the next. For example, a silence suppression interval N=5 packets means that a SID frame is guaranteed to be sent once every 5 packets. While sending of the SID frame or packet is "guaranteed," the base station or another component may lose the packet in transit, but a frame update is guaranteed by the set interval, as will be appreciated by those skilled in the art. The DTX scheme of C.S0076-0 allows for a silence suppression interval N in the range of one to 50, while the modified DTX scheme of C.S0014-D allows for a silence suppression interval N of 1, 4, or 8.

In the example of FIG. 2, the packet switch 132 employs a value N=10 for the silence suppression interval N of the silence suppression scheme. Accordingly, the packet switch 132 will forward one in ten of each eighth rate packet received from the base station 116. Referring to FIG. 2, the packet switch 132 forwards encoded packets 250, 260, and 270 to the packet switch 134 and "drops" or omits packets 251 through 259 and 261 through 269 during the period shown.

Since the base station 144 and mobile station 146 are configured without silence suppression, the packets dropped by the packet switch 132 are replaced or substituted by the packet switch 134. For example, the packet switch 134 repeats or copies a last received packet on the silence suppression interval (e.g., packets 250, 260, and 270) so that it appears to the mobile station 146 (and base station 144) that a continual sequence of packets is sent from the packet switch 134. Accordingly, FIG. 2 illustrates that the packet switch 134 sends ten instances of the packet 250, one "original" packet and nine additional instances or copies, as will be appreciated by those skilled in the art.

Figure 3:
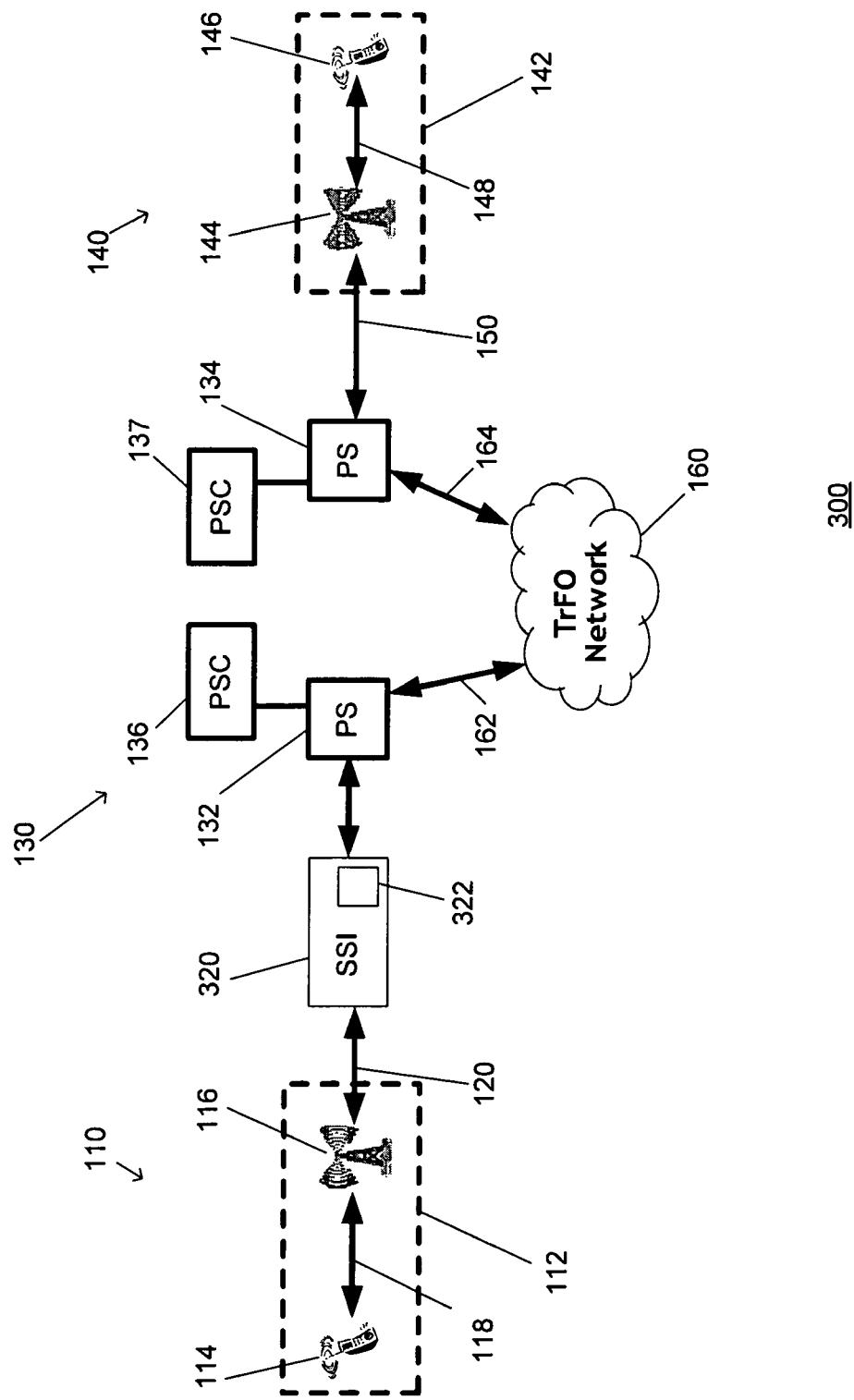
FIG. 3 is a representation of one embodiment of an apparatus that comprises a transmitting device, a packet-switched network, a receiving device, and a silence suppression interface component.

Turning to FIG. 3, one implementation of an apparatus 300 comprises the components of the apparatus 100 and further comprises a silence suppression interface (SSI) component 320. The SSI component 320 in one example comprises a network infrastructure device, application server, or other computing device. In another example, the SSI component 320 comprises a processor or computer that is configured to execute software or instructions stored in a memory. For example, the SSI component 320 comprises an instance of a recordable data storage medium 322, as described herein. The SSI component 320 in one example comprises one or more parameters or rules for the first and/or second silence suppression schemes, for example, stored on the recordable data storage medium 322. The SSI component 320 in one example is configured to be updated with additional and/or newer silence suppression schemes or parameters or rules of silence suppression schemes to support alternative codecs, transmitting devices, and/or receiving devices. For example, the SSI component 320 receives one or more parameters for a third silence suppression scheme and stores the parameters in the recordable data storage medium 322. The parameters and/or silence suppression schemes may be received over a network, human interface device (e.g., keyboard or terminal), or through another instance of the recordable data storage medium 322.

In the implementation of FIG. 3, the SSI component 320 is shown as a separate component from the calling party network 112 and the packet-switched network 130. However in alternate implementations, the SSI component 320 may be a device or component within the calling party network 112 or the packet-switched network 130. The SSI component 320 may also be combined, or formed integrally with a device or component of the calling party network 112, called party network 142, or packet-switched network 130, such as the base stations 116 or 144, the packet switch 132, or the packet switch 134. In other implementations, the air interfaces 118 and 148 may be replaced by a wireline, fiber optic, or other communication paths. Additionally, the calling party network 112 and the called party network 142 may be the same network or comprise a landline network.

Figure 4:
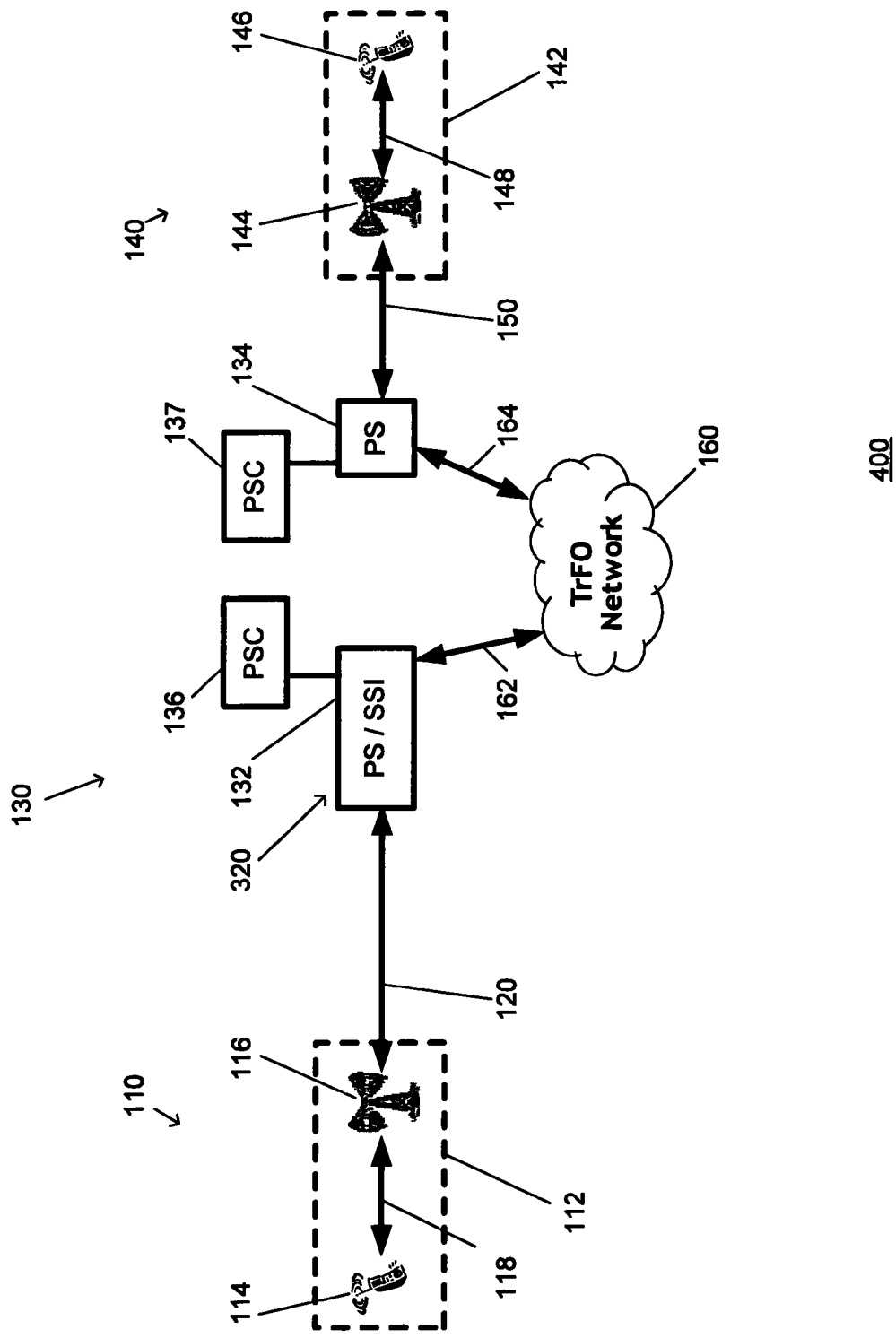
FIG. 4 is a representation of another embodiment of the apparatus of FIG. 3, illustrating the silence suppression interface component combined or integral with a packet switch of the packet-switched network.

Turning to FIG. 4, an apparatus 400 represents another implementation of the apparatus 300 and illustrates the SSI component 320 combined with the packet switch 132. In alternative implementations, the SSI component 320 may be combined with or implemented by a codec module, voice quality enhancement module (e.g., acoustic echo canceller, noise suppressor, automatic gain controller, and noise compensator), packet frame selector, network switch, network bridge, or router, as will be appreciated by those skilled in the art.

The SSI component 320 is configured to mediate between first and second silence suppression schemes. For example, the SSI component 320 is configured to receive a first voice stream that conforms to the first silence suppression scheme, alter the first voice stream to create a second voice stream that conforms to the second silence suppression scheme, and forward the second voice stream, as will be appreciated by those skilled in the art. The SSI component 320 in one example is configured for bi-directional mediation between the transmitting device 110 and receiving device 140. For example, either device 110 or 140 can send voice streams and/or receive altered voice streams via the SSI component 320.

Figure 5:
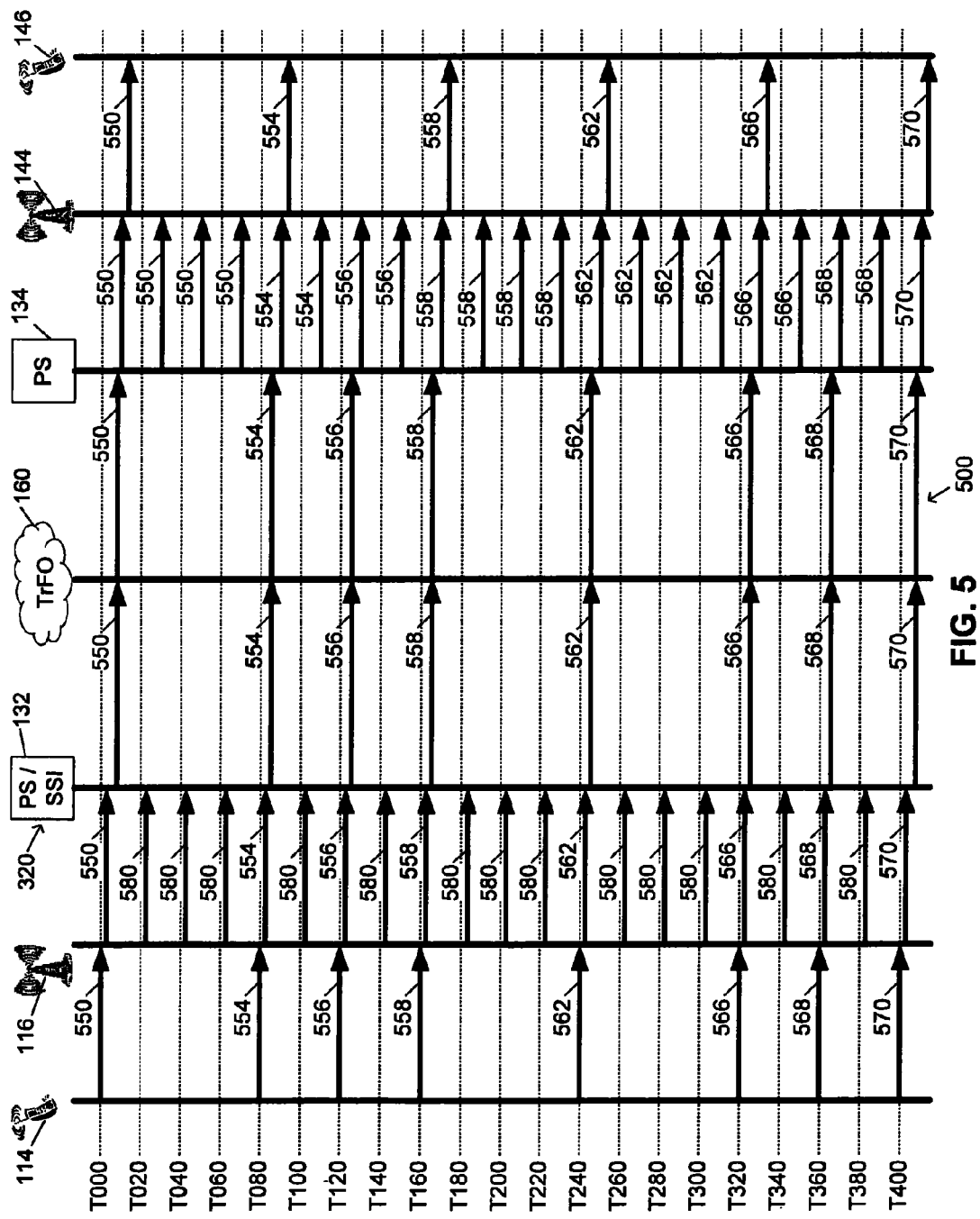
FIG. 5 is a representation of one implementation of a packet flow through the apparatus of FIG. 4, illustrating a pass-through of an EVRC-NW DTX silence suppression scheme to an RFC 4788 or similar silence suppression scheme.

Turning to FIG. 5, one example of a packet flow 500 for the implementation of FIG. 4 is shown. The SSI component 320 in this implementation (shown combined with the packet switch 132) is configured for mediating between two distinct silence suppression schemes by "passing through" each eighth rate packet that is received (with the exception of "blanks," as described herein). In the packet flow 500, the calling party network 112 and called party network 142 are configured to employ Enhanced Variable Rate Codec Narrowband-Wideband (EVRC-NW) DTX streams for silence suppression with a silence suppression interval N=4, while the packet-switched network 130 and TrFO network 160 are configured to employ DTX streams in accordance with RFC 4788 or similar (e.g., IETF draft-ieff-avt-rtp-evrc-nw-02) for silence suppression with a silence suppression interval N=10. For example, the interfaces 118, 120, 148, and 150 (as shown in FIG. 4) are configured for EVRC-NW DTX streams and the interfaces 162 and 164 (FIG. 4) are configured for RFC 4788 or similar DTX streams.

The packet flow 500 illustrates a potential problem of mediating between the calling and called party networks 112 and 142 using a newer silence suppression scheme while maintaining a silence suppression scheme currently used in the packet-switched network 130 between the networks 112 and 142. For example, a first silence suppression scheme (e.g., EVRC-NW) that employs asynchronous packets may have additional packets compared to a second silence suppression scheme (e.g., RFC 4788) that does not employ asynchronous packets.

One solution to the problem is to select a subset of packets from a voice stream that conforms to the first silence suppression scheme such that the subset of packets is compatible with the second silence suppression scheme, since the concern is with silence suppression and not voice encoding. Yet another solution would be to apply the same silence suppression scheme end-to-end. However, this change in the silence suppression scheme would require considerable resources (e.g., upgrading the packet-switched network to support the newer EVRC-NW codec and silence suppression scheme).

Referring to FIG. 5, the first silence suppression scheme comprises the EVRC-NW DTX scheme where the silence suppression interval N=4. Accordingly, the mobile station 114 sends an eighth rate packet after every fourth encoded packet, for example, eighth rate (or SID) packets 550, 554, 558, 562, 566, and 570 are sent upon the silence suppression interval. The eighth rate packets 550, 554, 558, 562, 566, and 570 in one example comprise synchronous packets or "non-critical" packets. The EVRC-NW DTX scheme further defines "critical" or asynchronous packets which comprise eighth rate packets that identify significant changes in background noise by the mobile encoder. Critical packets can be transmitted independently of the silence suppression interval. Examples of critical packets comprise packets 556 and 568 which occur outside of the silence suppression interval. The mobile station 114 sends a plurality of encoded packets for the voice stream, comprising the eighth rate packets 550, 554, 556, 558, 562, 566, 568, and 570 to the base station 116.

In the implementation of FIG. 5, the base station 116 is configured to forward the synchronous and asynchronous packets along with "blanks" or blanked packets 580 to the packet switch 132 (and SSI component 320). The blanks 580 in one example provide an indication that the interface 120 or "line" is still live and that an update or packet is expected. The blanks 580 in this example are not forwarded to the packet switch 134 or TrFO network 160.

The packet switch 132 forwards (e.g., selects and passes through) both the synchronous and asynchronous packets to the packet switch 134 (but not the blanks 580). The packet switch 134 forwards the synchronous and asynchronous packets to the base station 144 along with repeated packets to substitute for packets dropped by the packet switch 132. For example, the packet switch 134 sends four instances of the packet 550, two instances of the packet 554, etc. The base station 144 applies a silence suppression scheme where N=4 for forwarding the voice stream to the mobile station 146.

FIG. 5 is one embodiment of a solution which provides mediation between different silence suppression schemes by the SSI component 320. It shows an increase in traffic over the TrFO network 160, relative to FIG. 2, where silence is suppressed according to the RFC 4788 (or similar) DTX scheme. Further, this embodiment relies on the premise that EVRC-NW narrowband (NB) modes are compatible with EVRC-B vocoders. Here, the mobile stations are directed to use only EVRC-NW NB modes, and wideband (WB) mode 0 is disallowed, as will be appreciated by those skilled in the art.

Thus, FIG. 5 illustrates an embodiment where the silence suppression scheme employed in either calling party network 112 or called party network 142 is adapted for an end-to-end silence suppression scheme by the silence suppression interface component 320. However, this solution lacks the flexibility to maintain an existing configuration in the packet-switched network 130 that an operator of the packet-switched network 130 might prefer. Likewise, it is not usable where configurations (e.g., silence suppression schemes) of the calling party network 112, the packet-switched network 130, or called party network 142 differ. The goals and operative components of the packet-switched network 130 may differ from the goals and operative components of the calling party network 112 and called party network 142. Advantageously, the SSI component 320 as configured in FIGS. 6 and 8-10 allows for the calling party network 112, called party network 142, and packet-switched network 130 to each manage the voice stream for the packet-switched call independently and according to their respective operators' preference. In contrast, the configuration of FIGS. 5, 7, and 11 may require extra resources to provide an end to end solution.

Figure 6:
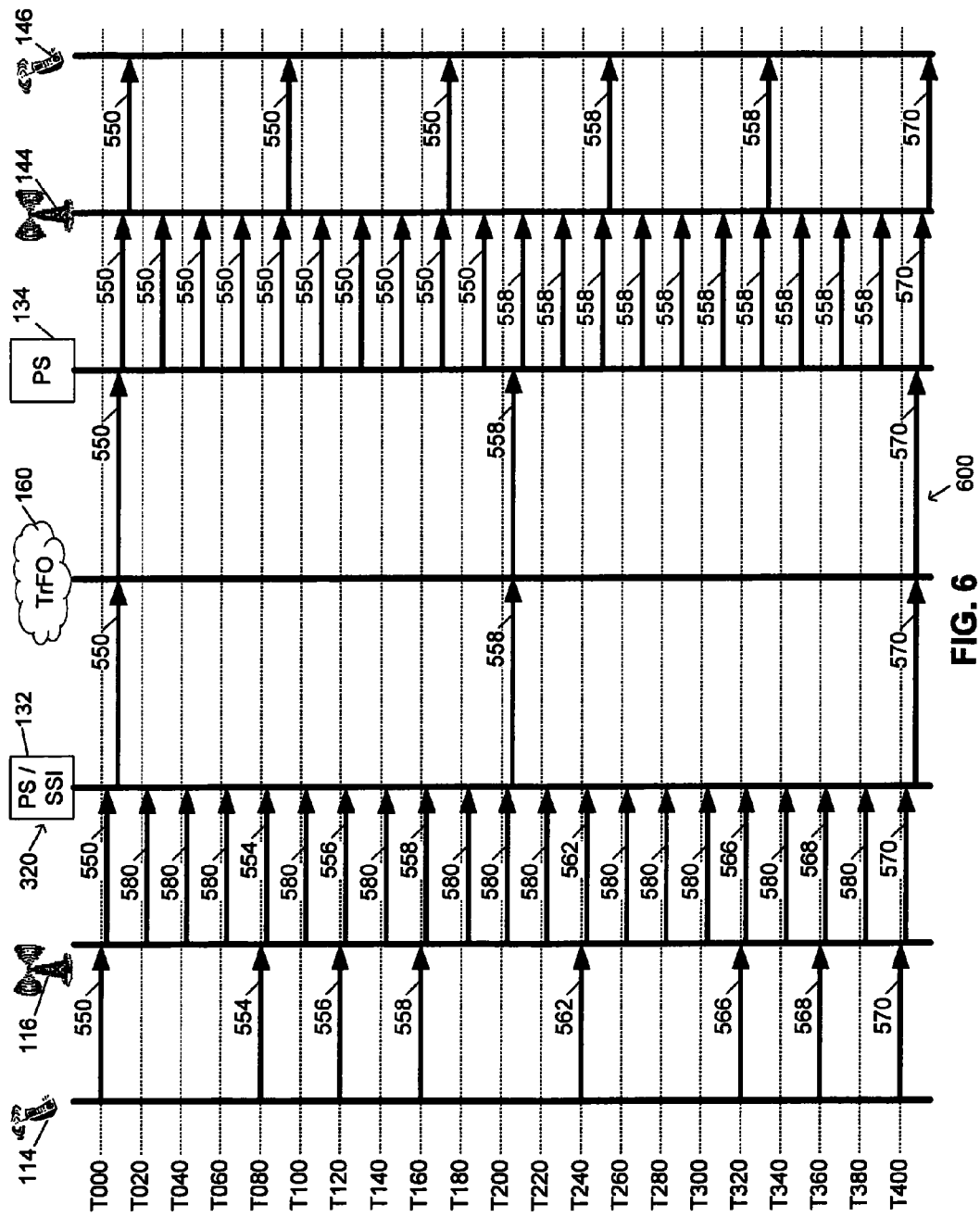
FIG. 6 is a representation of one implementation of a packet flow through the apparatus of FIG. 4, illustrating a mediation between an EVRC-NW DTX silence suppression scheme to an RFC 4788 or similar silence suppression scheme.

Turning to FIG. 6, a packet flow 600 for another implementation of the apparatus 300 is shown. The SSI component 320 (shown combined with the packet switch 132) is configured to mediate between the calling party network 112 and the packet-switched network 130. In this example, the EVRC-NW DTX scheme where N=4 is employed by the mobile station 114 as a first silence suppression scheme and a second silence suppression scheme (RFC 4788 or similar where N=10) is employed between packet switches 132 and 134. Packet flow 600 shows a 400 millisecond period of background noise through the voice stream.

The packet switch 132 is configured to alter a voice stream received from the base station 116 according to the second silence suppression scheme. Analogously to packet flow 500 in FIG. 5, the synchronous packets 550, 554, 558, 562, 566, and 570, the asynchronous packets 556 and 568, and the blanks 580 are forwarded to the packet switch 132 via the base station 116. The packet switch 132 counts the synchronous packets, asynchronous packets, and blanks in determining when to apply the silence suppression interval. The packet switch 132 in one example alters the voice stream by selecting a subset of received packets from the plurality of received packets of the voice stream. From the subset of received packets, the packet switch 132 creates a second voice stream that conforms to the silence suppression scheme of the packet-switched network 130. For example, the packets are selected by the packet switch 132 based on the parameters of the second silence suppression scheme. The packet switch 132 selects a most recently received packet on the silence suppression interval N=10 for the packet-switched network 130, instead of the silence suppression interval N=4 for the first silence suppression scheme, as will be appreciated by those skilled in the art.

The second voice stream comprises packets 550, 558, and 570, selected by the packet switch 132. The second voice stream is forwarded via the TrFO Network 160 to the packet switch 134. The packet switch 134 forwards the second voice stream to the base station 144 along with copies of the most recently received packets (e.g., packets 550 and 558) to fill in the remaining packets of the voice stream. The base station 144 then applies a silence suppression scheme for the called party network 142 (e.g., where N=4) to the received voice stream, as will be appreciated by those skilled in the art.

Figure 7:
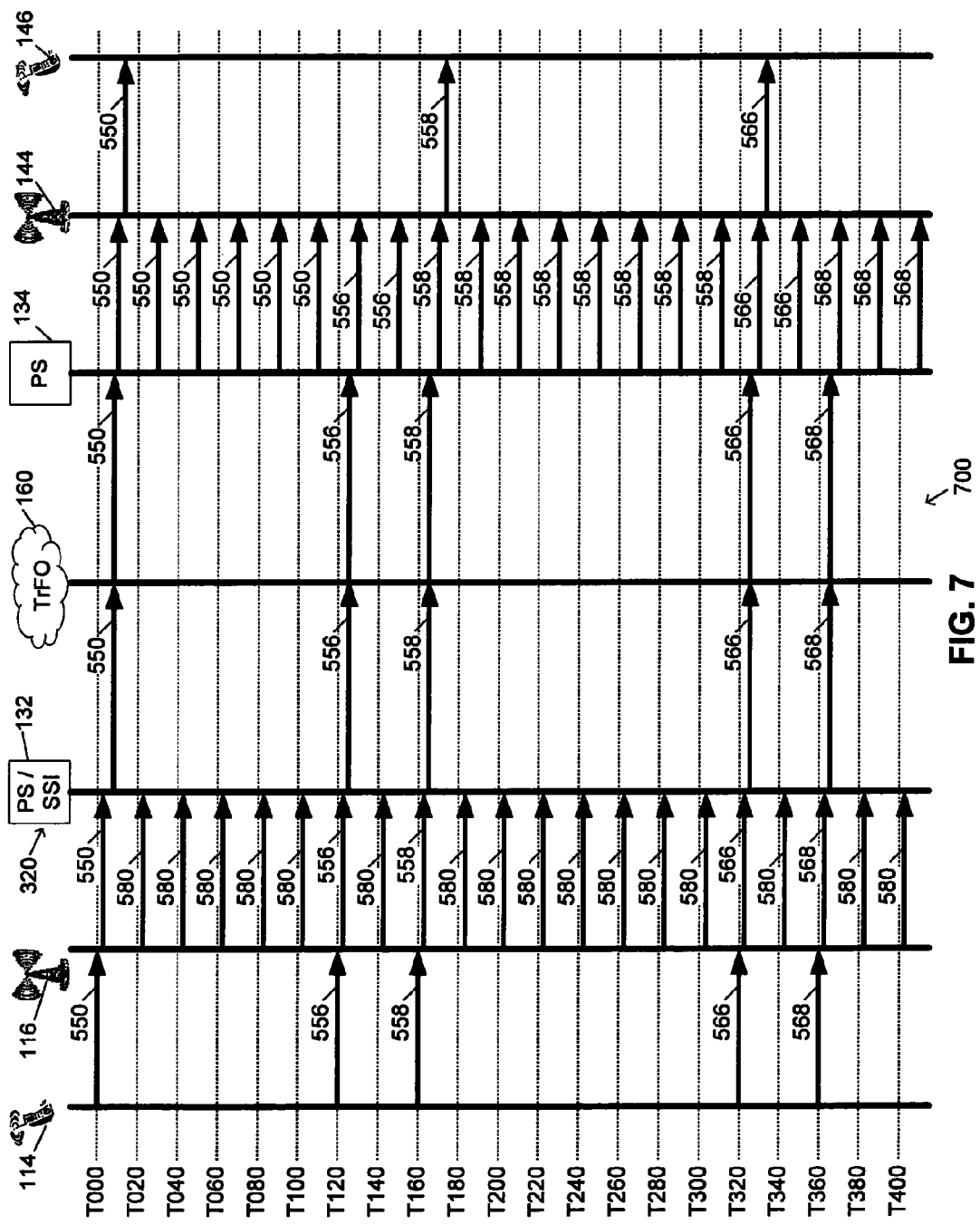
FIG. 7 is a representation of one implementation of a packet flow through the apparatus of FIG. 4, illustrating a pass-through of FIG. 5 with a different silence suppression interval.

Turning to FIG. 7, a packet flow 700 is similar to packet flow 500 of FIG. 5, but where the silence suppression interval of the calling party network 112 and called party network 142 have a guaranteed update interval of N=8. The packet switch 132 passes through packets 550, 556, 558, 566, and 568 in conformance with the silence suppression scheme of the mobile station 114 and base station 116. The packet switch 134 passes the received packets along with copies to the base station 144. The base station 144 then applies a silence suppression scheme with N=8 for forwarding the packets to the mobile station 146. Accordingly, mobile station 146 only receives packets 550, 558, and 566 but not the critical packets 556, 568 or the copies.

Figure 8:
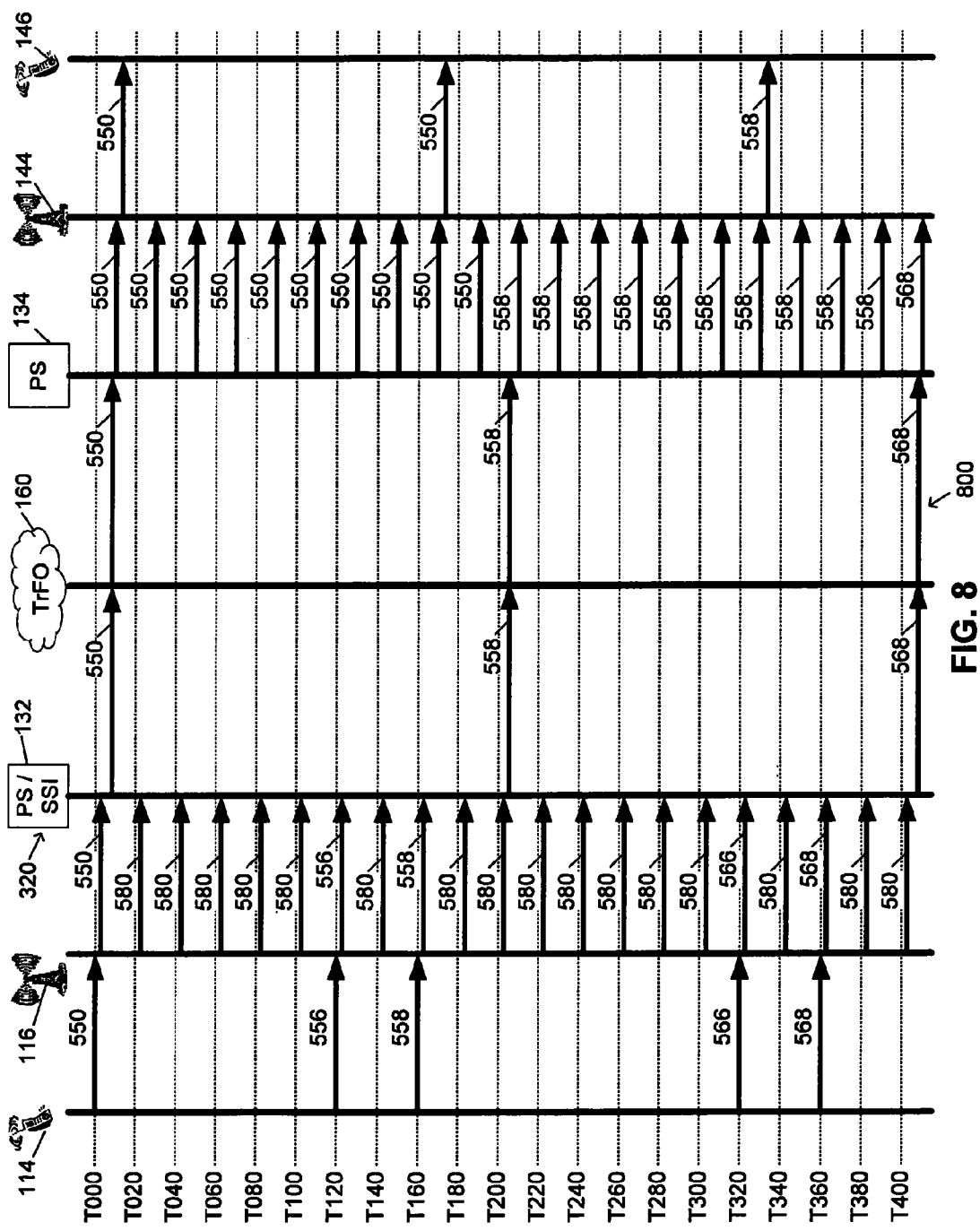
FIG. 8 is a representation of one implementation of a packet flow through the apparatus of FIG. 4, illustrating the mediation of FIG. 6 with a different silence suppression interval.

FIG. 8 illustrates a packet flow 800 similar to the packet flow 600 of FIG. 6. However, packet flow 800 shows an update interval N=10 for the packet-switched network 130 and an update interval of N=8 for the calling party network 112 and called party network 142. Accordingly, the SSI component 320 maintains the existing settings of the TrFO Network 160. Moreover, it adapts or alters the voice stream received from the base stations 116 by selecting the subset of received packets. The SSI component 320 facilitates transmission between networks with distinct silence suppression schemes, for example, the update intervals (or other parameters, rules, etc.) of the silence suppression schemes do not match between the calling party network 112 and the called party network 142.

Figure 9:
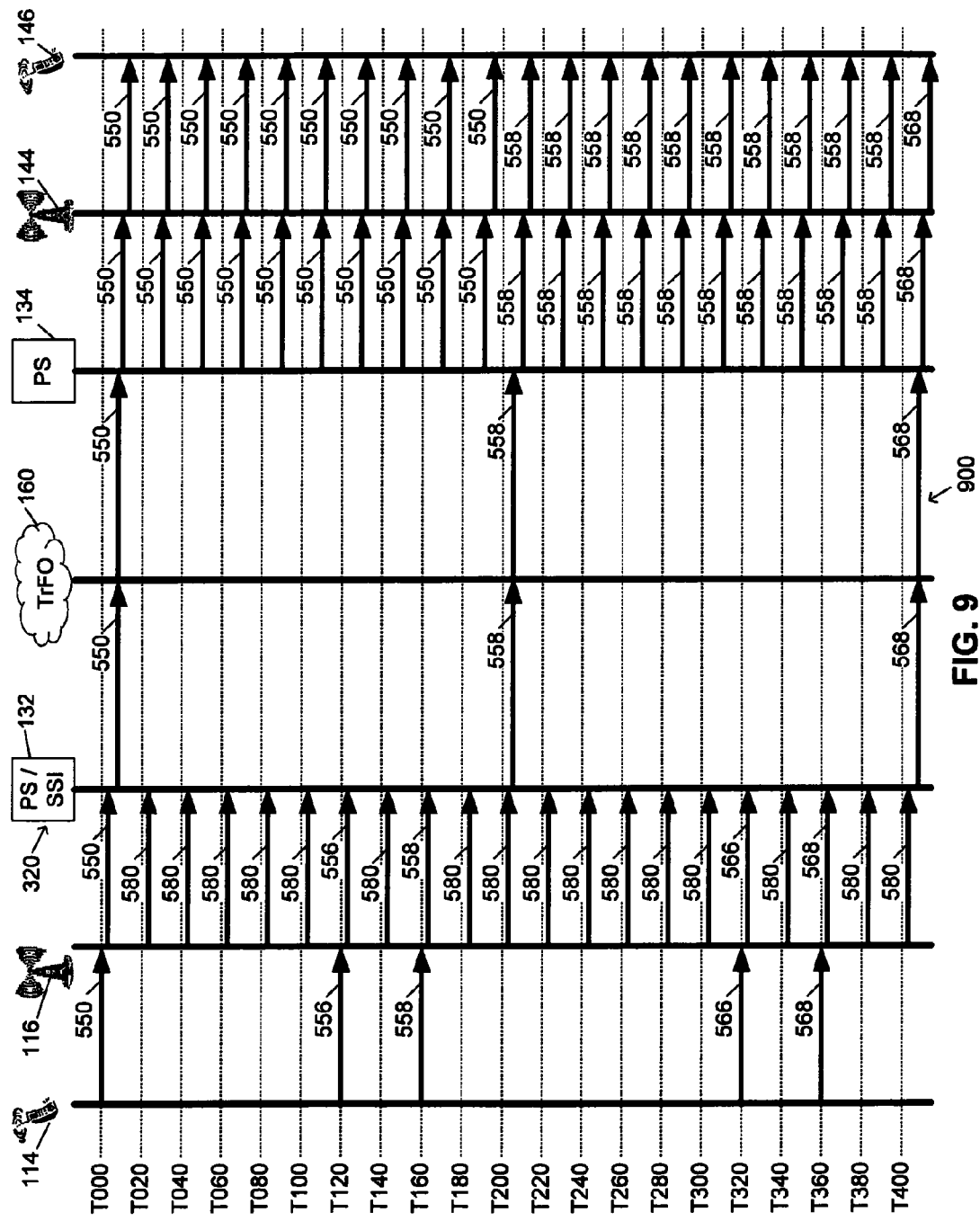
FIG. 9 is a representation of one implementation of a packet flow through the apparatus of FIG. 4, illustrating a mediation between mismatched codecs.

Turning to FIG. 9, a packet flow 900 is similar to packet flow 800 but modified for mismatched codecs. In adapting systems to allow silence intervals in packetized speech data to be sent at different update intervals within a network, the call domains can use different silence suppression schemes, or can use a voice encoder that does not contain a silence suppression scheme. In packet flow 900, the mobile station 114 and base station 116 employ EVRC-NW, with N=8, whereas the codec for mobile station 146 and base station 144 is EVRC-B, with no silence suppression included. Here, the called party network 142 is not using any form of silence suppression. This can occur where the receiving side is using an older service option or codec, such as EVRC-B as shown, or where silence suppression is disabled by setting N=1.

The packet switch 132 alters the voice stream received from the base station 116 by selecting a subset of the received packets 550, 556, 558, 566, and 568. The altered voice stream comprises packets 550, 558, and 568. The packets 550, 558, and 568 are forwarded to the packet switch 134, which forwards the packets along with copies to the mobile station 146 via base station 144. Accordingly, two call domains with distinct silence suppression schemes are interfaced with a call domain using an older voice codec without a silence suppression scheme.

Figure 10:
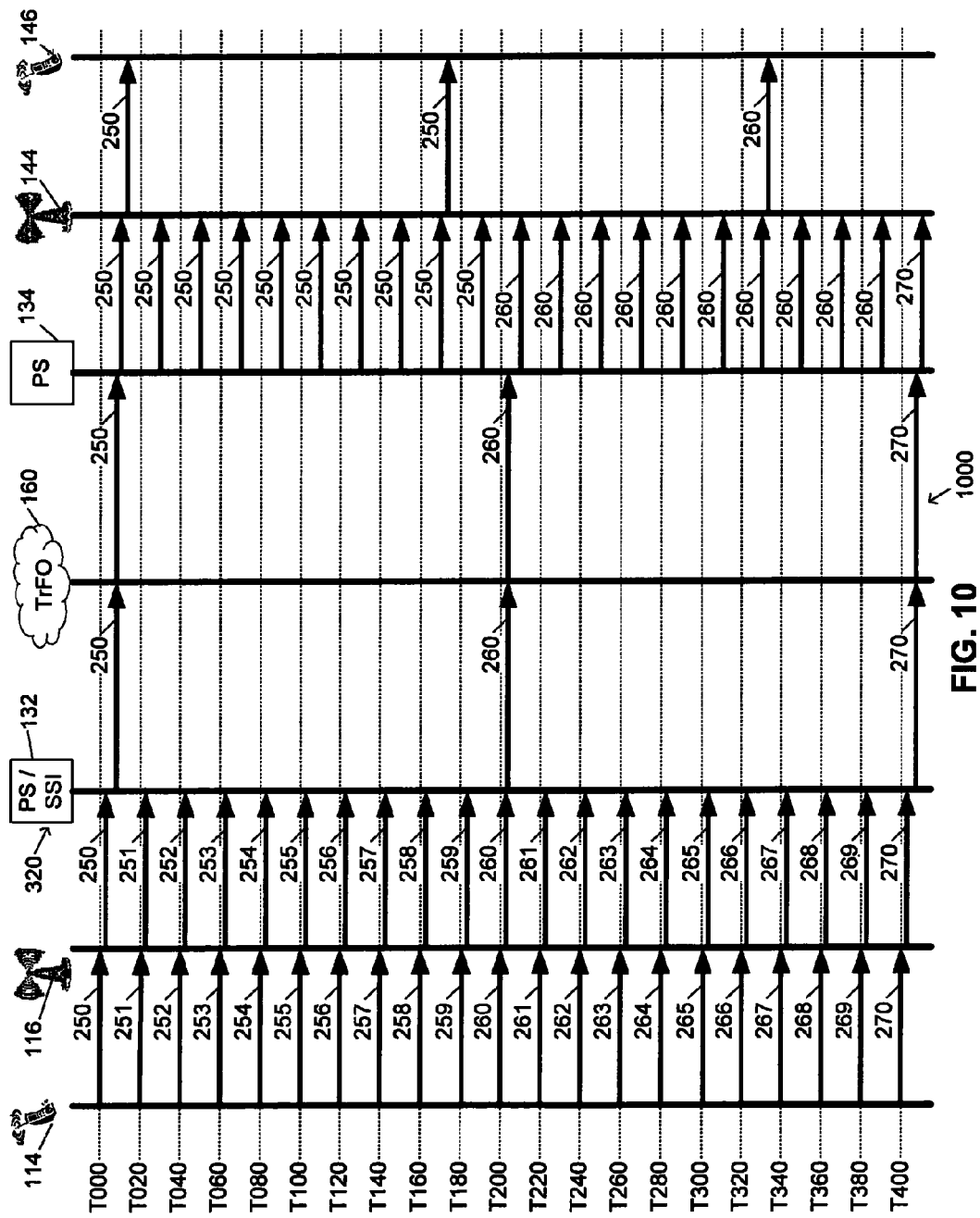
FIG. 10 is a representation of one implementation of a packet flow through the apparatus of FIG. 4, illustrating another mediation between mismatched codecs.

Turning to FIG. 10, a packet flow 1000 illustrates interfacing of mismatched codecs of a voice stream from EVRC-B to EVRC-NW, where N=10 for the silence suppression scheme in the packet-switched network 130. Here, the mobile station 114 is using an older voice encoder (e.g., EVRC-B) and is not performing silence suppression. The mobile station 146 is using a new voice codec including a silence suppression protocol, where N=8.

FIG. 10 shows a "reverse" of the codecs for the voice stream of FIG. 9, or the application of the EVRC-NW DTX scheme to a first voice stream without silence suppression in the calling party network 112 as shown in FIG. 2. Specifically, packet switch 132 applies silence suppression to the packets 251 through 259 and from 261 through 269 and passes packets 250, 260, and 270 to the packet switch 134. The packet switch 134 forwards the packets 250, 260, and 270 along with copies of packets 250 and 260. However in FIG. 10, the base station 144 applies the silence suppression scheme of the mobile station 146 to the voice stream.

As shown in FIGS. 9 and 10, additional variations in silence suppression schemes exist and are contemplated to be within the scope of the principles herein. For example, adjustments may be made by the base stations 114 and 116 to agree to send the blanked packets and by the packet switches 132 and 134 being set to pass or not pass critical packets, in order to accommodate application of distinct silence suppression schemes in the SSI component 320.

Figure 11:
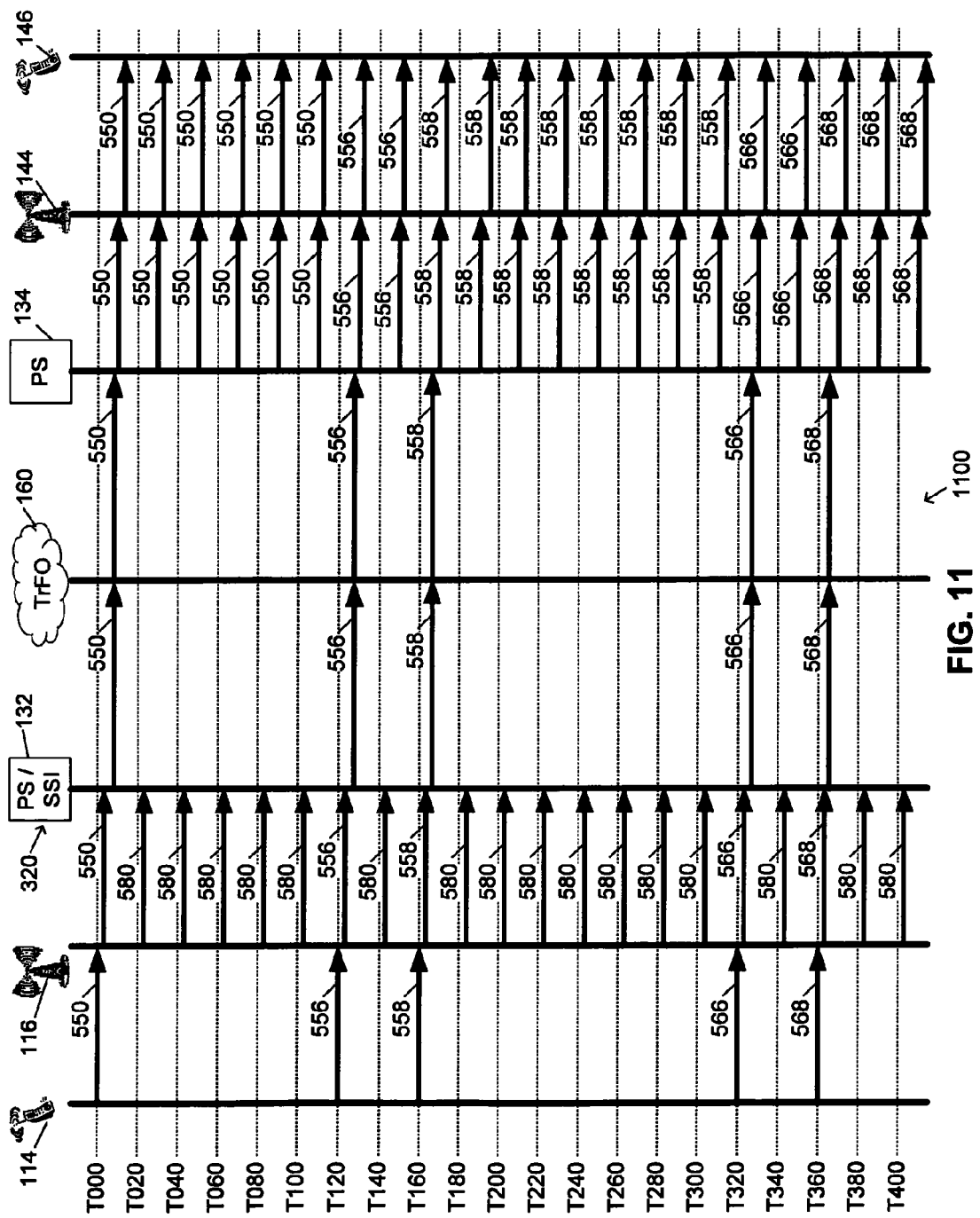
FIG. 11 is a representation of one implementation of a packet flow through the apparatus of FIG. 4, illustrating another variation to the pass-through of FIG. 5.

Turning to FIG. 11, a packet flow 1100 illustrates another variation of the "pass-through" of FIG. 5. In this example, the calling party network 112 employs the EVRC-NW DTX scheme with N=8. The called party network 142 is not performing silence suppression and is using the EVRC-B codec. The packet switch 132 in this example is configured to apply a silence suppression scheme using N=10.

While portions of the above description are related to, for example, mobile stations, packet-switched networks, and codecs such as EVRC, those skilled in the art will appreciate that alternate implementations and embodiments are possible. Alternate implementations of mobile stations comprise mobile phones, smart phones, voicemail servers, Voice over Internet Protocol (VoIP) terminals, personal computers, session initiation protocol (SIP) devices, telephony devices, or other devices configured to receive speech. Alternate implementations of packet-switched networks comprise local area networks, wide area networks, the Internet, other packet-switched networks and combinations thereof. Alternate implementations of codecs comprise EVRC-A, EVRC-B, EVRC-WB, EVRC-NW, Long Term Evolution (LTE) codecs, Adaptive MultiRate (AMR) codecs, and other speech or audio codecs where packets comprising background noise may be omitted. Accordingly, additional embodiments comprise wireline or landline networks, private phone networks, voicemail services, and combinations thereof. Additionally, while silence suppression schemes compatible with DTX and the above-mentioned 3GPP2 and IETF documents are described, alternative silence suppression schemes may be used with different rules, parameters, or criteria for dropping or omitting packets from the voice stream, as will be appreciated by those skilled in the art.

Referring to the implementation of FIG. 3, the silence suppression interface component 320 is configured to mediate between the transmitting device 110 and the packet-switched network 130 (e.g., between first and second silence suppression schemes). In alternative implementations, the silence suppression interface component 320 is configured to mediate between one or more additional devices, networks, and/or call domains with one or more respective silence suppression schemes. In a first example, the silence suppression interface component 320 is configured to provide mediation between one silence suppression scheme and a set of a number Z additional silence suppression schemes (e.g., "one-to-many" or 1-to-Z mediation). In a second example, the silence suppression interface component 320 is configured to provide mediation between a second set of a number Y of silence suppression schemes and the first set of silence suppression schemes, such as Y-to-Z mediation. The silence suppression interface component 320 in one example comprises a 1×Z or Y×Z decision table and/or matrix for mediation between multiple silence suppression schemes. Accordingly, the silence suppression interface component 320 is configured to mediate between multiple instances of the transmitting device 110, the receiving device 140, and/or the packet-switched network 130 with respective silence suppression schemes, as will be appreciated by those skilled in the art.

Figure 12:
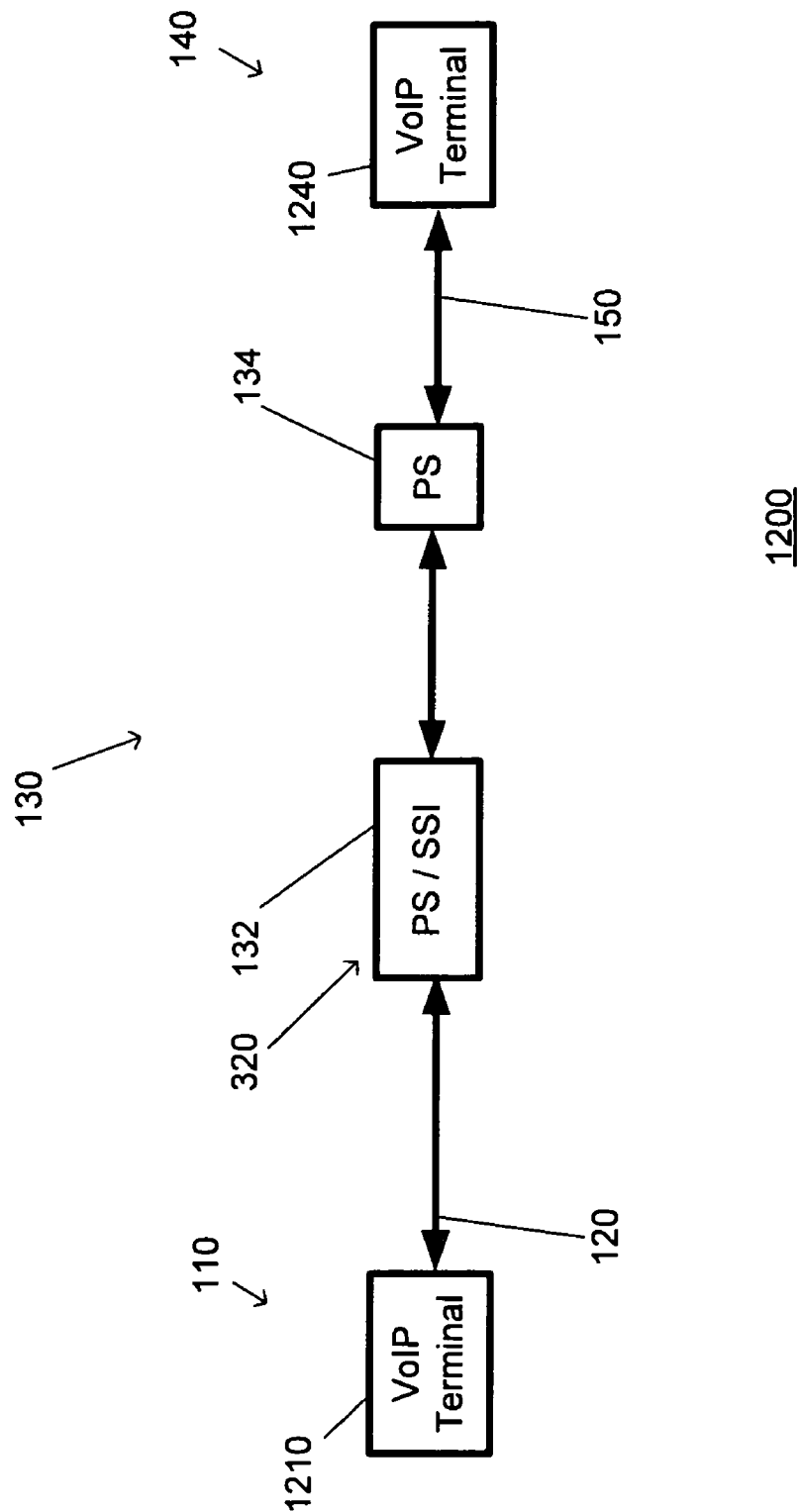
FIG. 12 is a representation of another embodiment of the apparatus of FIG. 3, illustrating Voice over IP terminals as the transmitting and receiving devices.

Turning to FIG. 12, an apparatus 1200 represents another implementation of the apparatus 300. The apparatus 1200 comprises the transmitting device 110, receiving device 140, and packet-switched network 130. In this implementation, the transmitting device 110 and receiving device 140 comprise Voice over IP terminals 1210 and 1240, respectively. The VoIP terminals 1210 and 1240 are configured to communicate over the packet-switched network 130. The VoIP terminal 1210 is configured to employ a first silence suppression scheme and to send a voice stream conforming to the first silence suppression scheme to the packet switch 132. The packet switch 132 comprises the SSI component 320 and is configured to alter the voice stream to conform to a second silence suppression scheme. Accordingly, the packet switch 132 selects a subset of packets from the voice stream to create a second voice stream that conforms to a second silence suppression scheme. The packet switch 134 is configured to replace or substitute one or more packets into the second voice stream before playback at the VoIP terminal 1240, as will be appreciated by those skilled in the art.

The apparatus 300 in one example employs one or more non-transitory processor-readable media. The non-transitory processor-readable media store software (e.g., compiled or interpreted code), firmware and/or assembly language for performing (e.g., by a processor or computer) one or more portions of one or more implementations of the invention. Examples of a non-transitory processor-readable medium for the apparatus 300 comprise the recordable data storage medium 322 of the SSI component 320. The non-transitory processor-readable media for the apparatus 300 in one example comprise one or more of a magnetic, electrical, optical, biological, and atomic data storage medium. For example, the non-transitory processor-readable media comprise floppy disks, magnetic tapes, CD-ROMs, DVD-ROMs, hard disk drives, and electronic memory. In another example, the non-transitory processor-readable media comprise removable or portable devices, such as flash memory drives.

The apparatus 300 in one example comprises a plurality of components such as one or more of electronic components, hardware components, and computer software components. A number of such components can be combined or divided in the apparatus 300. An example component of the apparatus 300 employs and/or comprises a set and/or series of computer instructions written in or implemented with any of a number of programming languages, as will be appreciated by those skilled in the art.

The steps or operations described herein are just for example. There may be many variations to these steps or operations without departing from the spirit of the invention. For instance, the steps may be performed in a differing order, or steps may be added, deleted, or modified.

Although example implementations of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

We claim:

1. A method, comprising the steps of:
    receiving a first voice stream for a packet-switched call from a calling party, wherein the first voice stream conforms to a first silence suppression scheme and comprises a plurality of encoded packets for the packet-switched call;
    selecting a subset of encoded packets from the plurality of encoded packets to create a second voice stream that conforms to a second silence suppression scheme, wherein the second voice stream comprises the subset of encoded packets, wherein the first silence suppression scheme is distinct from the second silence suppression scheme; and
    forwarding the second voice stream toward a called party for the packet-switched call, wherein the first voice stream comprises a first discontinuous transmission (DTX) stream and wherein the second voice stream comprises a second DTX stream,
    wherein the step of selecting the subset of encoded packets comprises the step of: selecting the subset of encoded packets according to the second silence suppression scheme, such that the second DTX stream conforms to the second silence suppression scheme,
    wherein the first and second silence suppression schemes comprise respective first and second silence suppression intervals;
    wherein the plurality of encoded packets comprise at least one of:
        a synchronous packet, sent upon the first silence suppression interval according to the first silence suppression scheme, or
        an asynchronous packet, sent independently of the first silence suppression interval according to the first silence suppression scheme;
    wherein the step of selecting the subset of encoded packets comprises the step of:
    selecting, upon the second silence suppression interval, a most recently received packet of the at least one of the synchronous packet or the asynchronous packet, wherein the subset of encoded packets comprises the most recently received packet;
    wherein the step of forwarding the second DTX stream comprises the step of:
    forwarding the most recently received packet upon the second silence suppression interval.

2. The method of claim 1, wherein the first silence suppression interval is distinct from the second silence suppression interval.

3. The method of claim 1, wherein the first silence suppression scheme conforms to an Enhanced Variable Rate Codec Narrowband-Wideband (EVRC-NW) standard;
    wherein the synchronous packet comprises a rate $\frac{1}{8}^{th}$ non-critical packet of the EVRC-NW standard;
    wherein the second silence suppression scheme conforms to an Enhanced Variable Rate Codec B (EVRC-B) standard.

4. The method of claim 3, wherein the step of receiving the voice stream comprises the step of:
    receiving the voice stream from a cellular base station that employs the EVRC-NW standard;
    wherein the step of forwarding the second DTX stream comprises the step of:
    forwarding the second DTX stream toward a Transcoder Free Operation (TrFO) network that employs the EVRC-B standard.

5. A method, comprising the steps of:
    receiving a first voice stream for a packet-switched call from a calling party, wherein the first voice stream conforms to a first silence suppression scheme and comprises a plurality of encoded packets for the packet-switched call;
    selecting a subset of encoded packets from the plurality of encoded packets to create a second voice stream that conforms to a second silence suppression scheme, wherein the second voice stream comprises the subset of encoded packets, wherein the first silence suppression scheme is distinct from the second silence suppression scheme; and
    forwarding the second voice stream toward a called party for the packet-switched call, wherein the first voice stream comprises a first discontinuous transmission (DTX) stream and wherein the second voice stream comprises a second DTX stream, wherein the step of selecting the subset of encoded packets comprises the step of: selecting the subset of encoded packets according to the second silence suppression scheme, such that the second DTX stream conforms to the second silence suppression scheme, wherein the step of selecting the subset of encoded packets comprises the steps of:

receiving one or more parameters of the second silence suppression scheme; and selecting the subset of encoded packets based on the one or more parameters.

6. The method of claim 5, further comprising the steps of:

receiving one or more parameters of a third silence suppression scheme that is distinct from the first and second silence suppression schemes;

storing the one or more parameters of the third silence suppression scheme; and selecting the subset of encoded packets based on the one or more parameters of the third silence suppression scheme.

7. An apparatus, comprising:

a silence suppression interface component configured to receive a first voice stream for a packet-switched call from a transmitting device;

wherein the first voice stream conforms to a first silence suppression scheme and comprises a plurality of encoded packets for the packet-switched call;

wherein the silence suppression interface component is configured to select a subset of encoded packets from the plurality of encoded packets to create a second voice stream that conforms to a second silence suppression scheme;

wherein the second voice stream comprises the subset of encoded packets;

wherein the first silence suppression scheme is distinct from the second silence suppression scheme;

wherein the silence suppression interface component is configured to forward the second voice stream toward a receiving device for the packet-switched call;

wherein the first voice stream comprises a first discontinuous transmission (DTX) stream;

wherein the second voice stream comprises a second DTX stream;

wherein the first and second silence suppression schemes comprise respective first and second silence suppression intervals;

wherein the plurality of encoded packets comprise at least one of:

a synchronous packet, sent upon the first silence suppression interval according to the first silence suppression scheme, or an asynchronous packet, sent independently of the first silence suppression interval according to the first silence suppression scheme;

wherein the silence suppression interface component is configured to select a most recently received packet of the at least one of the synchronous packet or the asynchronous packet upon the second silence suppression interval.

8. The apparatus of claim 7, wherein the first silence suppression interval is distinct from the second silence suppression interval.

9. The apparatus of claim 8, wherein the second voice stream is forwarded via the silence suppression interface component toward the receiving device through a packet-switched network;

wherein the packet-switched network employs the second silence suppression scheme.

10. The apparatus of claim 8, wherein the first silence suppression scheme conforms to an Enhanced Variable Rate Codec Narrowband-Wideband (EVRC-NW) standard;

wherein the synchronous packet comprises a rate $\frac{1}{8}^{th}$ non-critical packet of the EVRC-NW standard;

wherein the second silence suppression scheme conforms to an Enhanced Variable Rate Codec B (EVRC-B) standard.

11. An apparatus, comprising:

a silence suppression interface component configured to receive a first voice stream for a packet-switched call from a transmitting device;

wherein the first voice stream conforms to a first silence suppression scheme and comprises a plurality of encoded packets for the packet-switched call;

wherein the silence suppression interface component is configured to select a subset of encoded packets from the plurality of encoded packets to create a second voice stream that conforms to a second silence suppression scheme;

wherein the second voice stream comprises the subset of encoded packets;

wherein the first silence suppression scheme is distinct from the second silence suppression scheme;

wherein the silence suppression interface component is configured to forward the second voice stream toward a receiving device for the packet-switched call;

wherein the silence suppression interface component is configured to mediate between a first set of a number Y silence suppression schemes and a second set of a number Z silence suppression schemes;

wherein the first set of silence suppression schemes comprises the first silence suppression scheme;

wherein the second set of silence suppression schemes comprises the second silence suppression scheme.

12. An article, comprising:

one or more non-transitory processor-readable media storing instructions which, when executed by a processor, cause the processor to perform a method comprising the steps of:

receiving a first voice stream for a packet-switched call from a calling party, wherein the first voice stream conforms to a first silence suppression scheme and comprises a plurality of encoded packets for the packet-switched call;

selecting a subset of encoded packets from the plurality of encoded packets to create a second voice stream that conforms to a second silence suppression scheme, wherein the second voice stream comprises the subset of encoded packets, wherein the first silence suppression scheme is distinct from the second silence suppression scheme; and forwarding the second voice stream toward a called party for the packet-switched call, wherein the first voice stream comprises a first discontinuous transmission (DTX) stream and wherein the second voice stream comprises a second DTX stream, wherein the step of selecting the subset of encoded packets comprises the step of:

selecting the subset of encoded packets according to the second silence suppression scheme, such that the second DTX stream conforms to the second silence suppression scheme, wherein the first and second silence suppression schemes comprise respective first and second silence suppression intervals;
wherein the plurality of encoded packets comprise at least one of:
  a synchronous packet, sent upon the first silence suppression interval according to the first silence suppression scheme, or
  an asynchronous packet, sent independently of the first silence suppression interval according to the first silence suppression scheme;
wherein the step of selecting the subset of encoded packets comprises the step of:
selecting, upon the second silence suppression interval, a most recently received packet of the at least one of the synchronous packet or the asynchronous packet, wherein the subset of encoded packets comprises the most recently received packet;
wherein the step of forwarding the second DTX stream comprises the step of:
forwarding the most recently received packet upon the second silence suppression interval.

13. The article of claim 12, wherein the first silence suppression interval is distinct from the second silence suppression interval.

14. A method, comprising the steps of:
receiving a first voice stream for a packet-switched call from a calling party, wherein the first voice stream conforms to a first silence suppression scheme and comprises a plurality of encoded packets for the packet-switched call; and
forwarding the first voice stream toward a called party for the packet-switched call over a packet-switched network, wherein the packet-switched network is configured to receive voice streams which conform to a second silence suppression scheme, wherein the first silence suppression scheme is distinct from the second silence suppression scheme,
wherein the plurality of encoded packets comprise at least one of:
  a synchronous packet, sent upon the first silence suppression interval according to the first silence suppression scheme, or
  an asynchronous packet, sent independently of the first silence suppression interval according to the first silence suppression scheme;
wherein the second silence suppression scheme does not employ asynchronous packets;
wherein the step of forwarding comprises the step of:
forwarding one or more asynchronous packets of the first voice stream across the packet-switched network.

15. The method of claim 14, wherein the step of forwarding the one or more asynchronous packets comprises the step of:
forwarding the one or more asynchronous packets independently of a silence suppression interval of the second silence suppression scheme.

\* \* \* \* \*

UNITED STATES PATENT AND TRADEMARK OFFICE
CERTIFICATE OF CORRECTION

PATENT NO. : 8,751,223 B2  
APPLICATION NO. : 13/068924  
DATED : June 10, 2014  
INVENTOR(S) : Hiltner et al.

Page 1 of 1

It is certified that error appears in the above-identified patent and that said Letters Patent is hereby corrected as shown below:

In the Claims

At Col. 12, line 41

Please insert the following text after the word "the" and before the word "voice"

--first--

At Col. 12, line 43

Please insert the following text after the word "the" and before the word "voice"

--first--

Signed and Sealed this  
Twenty-third Day of December, 2014

Michelle K. Lee  
*Deputy Director of the United States Patent and Trademark Office*